No. 810,792. PATENTED JAN. 23, 1906.
J. McINTOSH.
CARBURETER.
APPLICATION FILED OCT. 15, 1904.
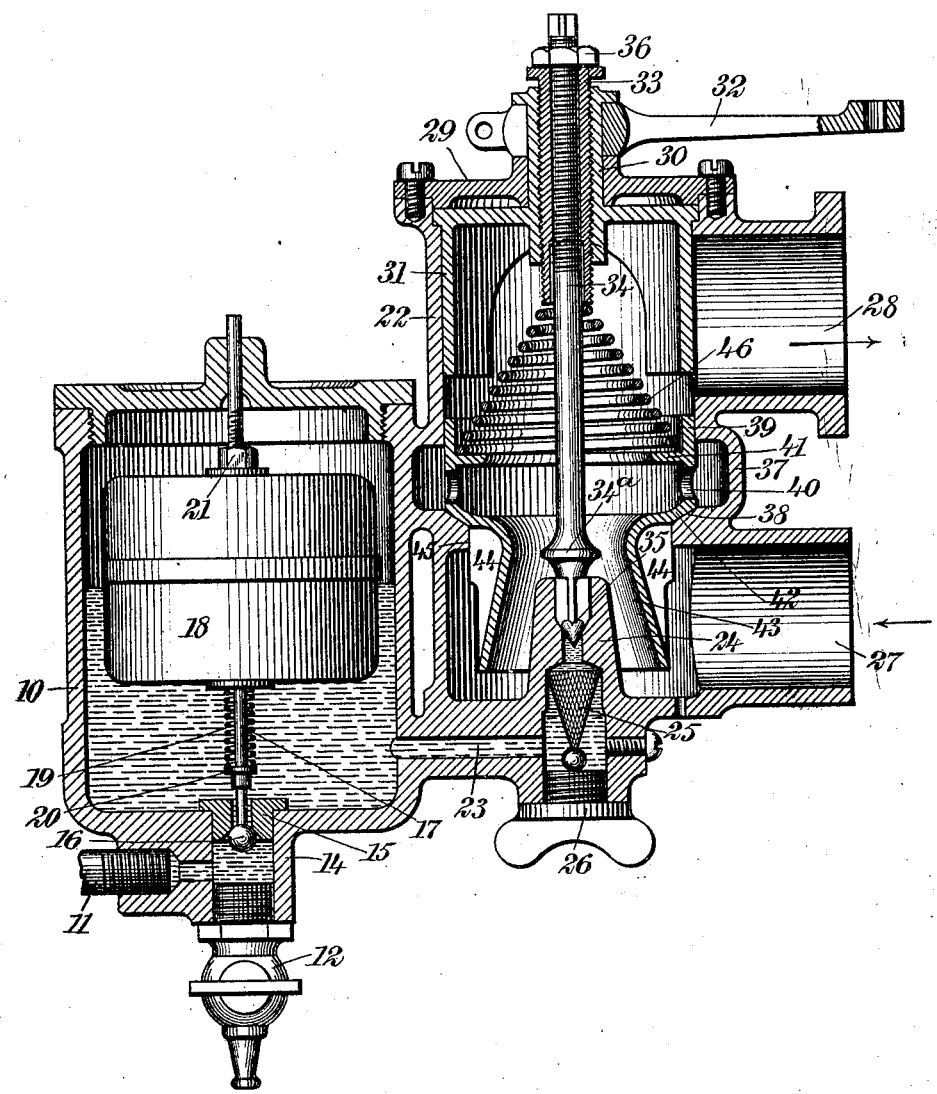
WITNESSES:
INVENTOR
James McIntosh
BY
ATTORNEYS

UNITED STATES PATENT OFFICE.

JAMES McINTOSH, OF LANSING, MICHIGAN.

CARBURETER.

No. 810,792. Specification of Letters Patent. Patented Jan. 23, 1906.

Application filed October 15, 1904. Serial No. 228,563.

*To all whom it may concern:*

Be it known that I, JAMES MCINTOSH, a citizen of the United States, and a resident of Lansing, in the county of Ingham and State of Michigan, have invented a new and Improved Carbureter for Hydrocarbon-Engines, of which the following is a full, clear, and exact description.

The invention relates to a carbureter or vaporizer designed particularly for use in connection with internal-combustion engines, but useful in other connections, as will be apparent to skilled mechanics.

The leading object of the invention is to provide devices for automatically regulating the action of the carbureter upon excessive sucking efforts therein, so that when the engine runs at high speed the ratio of the air to the fuel will be increased proportionately.

A further object of the invention is to insure a thorough spraying action of the liquid fuel, and consequently to attain a thorough admixture of the air and fuel.

A further object of the invention is to provide a means for easily adjusting the float, so that the action of the oil or spirit supply valve may be readily regulated to suit the specific gravity of the oil or spirit used.

These ends I attain by certain novel features of construction and relative arrangement of parts, which will be fully set forth hereinafter, and pointed out in the claims.

Reference is had to the accompanying drawing, forming a part of this specification, which illustrates as an example a vertical section of the preferred embodiment of my invention.

In the drawing, 10 indicates a hydrocarbon-oil reservoir, 11 being the supply-pipe, and 12 a drip-cock. Secured in a tubular extension 14 at the bottom of the reservoir 10 is a valve-seat 15, with which coöperates a ball-valve 16, connected to the stem 17 of the float 18. The stem 17 extends upward through the reservoir 10, as usual, and the float is loose on the stem. At its bottom the float is engaged by a spring 19, also engaging a collar 20, fast on the stem 17, and at its top the float is engaged by a nut 21, threaded on the stem 17. By adjusting the single nut 21 the position of the float with respect to the stem may be regulated at will, the spring holding the float snugly against the stem at all times. The float automatically operating the valve 16 maintains the hydrocarbon oil at a height within the reservoir 10 dependent upon the adjustment of the float, as will be fully understood from the prior art.

22 indicates the vaporizer-chamber, which preferably is immediately juxtaposed to the reservoir 10 and communicates therewith by way of a passage 23, leading to a vaporizer-nozzle 24, which opens centrally in the lower part of the vaporizer-chamber. Below the vaporizer-nozzle 24 is a strainer 25 and a plug 26, which may be of the usual or any desired construction.

In practice the adjustment of the float 18 should be such as to maintain the liquid fuel in the nozzle 24 at a point level with the upper extremity thereof. An air-inlet pipe 27 opens into the lower part of the vaporizer-chamber, and 28 indicates a connection with the inlet-port of the engine, the air-current passing in by the pipe 27 and the mixture passing to the engine by the pipe 28. The vaporizer-chamber is fitted with a top 29, in which is located friction-tight the tubular stem 30 of a gate 31 for throttling the communication 28. Attached to said stem 30 is an arm 32 for manually or otherwise operating the said gate. A sleeve 33 is threaded within the tubular stem 30, and threaded within said sleeve is the stem 34 of the vaporizer-valve 35. 36 indicates a lock-nut applied to the upper end of the stem to hold the valve at the desired adjustment. By this construction the valve 35 may be adjusted independently of the gate 31, and when the gate is operated to throttle the communication 28 the valve 35, being friction-tight in the sleeves 30 and 33, will be turned in its seat. This turning of the valve 35 tends to keep the valve fitted true in its seat and to remove any solid matter that may accumulate therein. The upper and lower parts of the vaporizer-chamber 22 are separated by an enlargement 37, forming an air-chamber lying intermediate the communications 27 and 28. The lower side of this air-chamber has an annular seat 38, on which operates the automatic mixing-valve. Said valve comprises a cylindric upper part 39, fitting normally in the intermediate part of the vaporizer-casing inside of the enlargement 37. The said cylindric part 39 is provided with orifices 40, communicating with the air-belt formed by the enlargement 37, and above said orifices the cylindric part of the valve is provided with an inwardly-extending annular baffle 41, which is intended to encounter the air and fuel spray and to bring about a thorough admixture of the same. Below the cylindric part 39 the automatic mixing-valve is provided with an inwardly-tapered portion 42, forming a valve proper bearing on the seat 38, and from this portion 42 the walls of the valve curve inward and thence outward and downward to form a throat 43, encircling the nozzle 24. Said throat has in its outer side ribs 44, forming guides bearing against an annular wall formed in the vaporizer-casing 22 below the seat 38.

46 indicates a helical spring which bears between the top of the baffle 41 and the lower end of the sleeve 33 and holds the automatic mixing-valve yieldingly in the position shown in the drawing.

The valve thus constructed is capable of seating, as shown in the drawing, so that the only passage past the valve will be through the throat 43, the air passing in the valve 37 downward below the throat, up through the throat, where it absorbs the sprayed fuel, and thence upward through the baffle 41 and out through the connection 28. At this time there is no fluid movement past the seat 38 and through the orifices 40. Should the operation cease to be normal, however, and an excessive sucking effort be exerted through the connection 28, due, for example, to excessive speed of the engine, the unusual pressure exerted on the lower side of the automatic valve will lift the same against the action of the spring 46 and force a quantity of air to pass the seat 38 into the enlargement or chamber 37, thus forming an air-belt around the valve, the air from this belt passing in through the orifices 40, so that not only is the normal quantity of air drawn through the throat 43, but an extra quantity is supplied through the orifices 40 below the baffle 41, this extra supply mixing with the vapor already formed. A further result of this lifting of the automatic valve is that when the throat 43 is raised with respect to the nozzle 24 the flaring lower end of the throat encircles the nozzle and a larger air-passage is produced past the mouth of the nozzle and within the throat, so that the air is less rarefied at this time and less liquid is sucked from the nozzle than when the parts are under normal operation. The instant the suction in the pipe 28 falls to normal the spring 46 will return the valve, and the operation of the vaporizer will again become normal. The valve 35 is fluted, corrugated, flattened, or angular in cross-section at a point above its seat, and the stem 34 is provided with a deflector collar or enlargement 34ª immediately above the ribs or flutes of the valve. When, therefore, the liquid fuel is sucked from the nozzle, it is divided into a plurality of streams which pass upward, and striking the deflector 34ª are thrown outward into the narrow part of the throat 43, where they encounter the inrushing current of air and are effectively charged thereby, thus forming a thorough mixture of air and fuel. The seat of the valve is formed in the nozzle between its ends, and the fluted portion of the stem extends through the discharge portion of the nozzle, serving to assist in breaking up the fluid as it passes into the throat.

Various changes in the form, proportions, and minor details of my invention may be resorted to at will without departing from the spirit and scope thereof. Hence I consider myself entitled to all such variations as may lie within the terms of my claims.

Having thus described my invention, I claim as new and desire to secure by Letters Patent—

1. A vaporizer having a liquid-fuel-supply nozzle with a valve-seat intermediate its ends, a throat surrounding said nozzle and adapted to have an air-current pass through it, said throat contracting toward the discharge end of the vaporizer, a valve coacting with the seat in and commanding the discharge-nozzle, and a fluted or ribbed stem extending from the valve through the discharge portion of the seat, for the purpose specified.

2. A vaporizer having a valve to throttle the mixture passing from the vaporizer, a liquid-fuel-supply nozzle, a spraying-valve coacting therewith, and a connection between the two valves to turn the latter upon turning the former.

3. A vaporizer having a liquid-fuel-supply nozzle, a throat surrounding said nozzle and adapted to have an air-current pass through it, said throat contracting toward the discharge end of the vaporizer, a valve commanding the discharge-nozzle, a fluted or ribbed stem extending from the valve for the purpose specified, and said stem having a deflector collar or enlargement above its said ribs and within the throat.

4. A vaporizer comprising a casing having inlet and outlet orifices respectively for the air and mixture, a liquid-fuel-supply nozzle leading into the casing intermediate said inlet and outlet orifices, and an automatic mixing-valve comprising a throat surrounding the nozzle, a yieldingly-seated valve proper above the throat, and an annular baffle above said valve proper.

5. A vaporizer comprising a casing having inlet and outlet orifices respectively for the air and mixture, a liquid-fuel-supply nozzle leading into the casing intermediate said inlet and outlet orifices, an automatic mixing-valve comprising a throat surrounding the nozzle, a yieldingly-seated valve proper above the throat, and a wall rising from the valve proper, the casing having walls forming an air-chamber surrounding the said wall of the valve, and the said wall of the valve being orificed to communicate with said air-chamber for the purpose specified.

6. A vaporizer comprising a casing having inlet and outlet orifices respectively for the air and mixture, a liquid-supply nozzle leading into the casing intermediate said inlet and outlet orifices, an automatic mixing-valve comprising a throat surrounding the nozzle, a yieldingly-seated valve proper above the throat, and a wall rising from the valve proper, the casing having walls forming an air-chamber surrounding the said wall of the valve, and the said wall of the valve being orificed to communicate with said chamber for the purpose specified, and an annular interior baffle extending around the said wall of the valve above the orifice therein.

7. A vaporizer comprising a casing having inlet and outlet orifices respectively for the air and mixture and also having a valve-seat and walls forming an air-chamber above the seat, a supply-nozzle extending into the vaporizer intermediate said inlet and outlet orifices, an automatic mixing-valve located in the casing and comprising a throat surrounding the nozzle, a valve proper above the throat and bearing on the said seat, and a wall rising from the valve proper and lying opposite the air-chamber in the casing, said wall of the valve being orificed opposite the air-belt for the purpose specified.

8. A vaporizer comprising a casing having inlet and outlet orifices respectively for the air and mixture and also having a valve-seat and walls forming an air-chamber above the seat, a supply-nozzle extending into the vaporizer intermediate said inlet and outlet orifices, an automatic mixing-valve located in the casing and comprising a throat surrounding the nozzle, a valve proper above the throat and bearing on the said seat, and a wall rising from the valve proper and lying opposite the air-chamber in the casing, said wall of the valve being orificed opposite the air-chamber for the purpose specified, and an annular interior baffle carried by said wall of the valve above the orifice therein.

9. A vaporizer having a liquid-fuel-supply nozzle, a throat surrounding said nozzle and adapted to have an air-current pass through it, said throat contracting toward the discharge end of the vaporizer, and the liquid-fuel nozzle having a valve-seat therein intermediate its ends, a valve coacting with said seat, a stem connected to the valve and having a fluted or ribbed portion directly adjacent thereto, said fluted or ribbed portion extending through the discharge portion of the nozzle, and a deflector carried by the stem opposite the said nozzle and within the throat.

10. A vaporizer comprising a casing having inlet and outlet orifices, a seat located intermediate the orifices, walls forming an air-chamber adjacent to the seat, a liquid-supply nozzle leading into the casing, an automatic mixing-valve comprising a normally opened throat, a valve proper coacting with the seat of the casing, and an upwardly-extending wall lying opposite said air-chamber and formed with an orifice therein.

11. A vaporizer comprising a casing having inlet and outlet orifices, a seat located intermediate the orifices, walls forming an air-chamber adjacent to the seat, a liquid-supply nozzle leading into the casing, an automatic mixing-valve comprising a normally opened throat, a valve proper coacting with the seat of the casing, an upwardly-extending wall lying opposite said air-chamber and formed with an orifice therein, and an inwardly-extending annular baffle carried by said wall of the mixing-valve above the orifice therein.

12. A vaporizer comprising a casing having inlet and outlet orifices respectively for the air and mixture, a liquid-supply nozzle leading into the casing intermediate said inlet and outlet orifices, an automatic mixing-valve controlling an auxiliary air-supply, a valve to throttle the mixture passing from the vaporizer, a tubular stem for operating the valve, a valve commanding the liquid-supply nozzle, a spring engaging the automatic mixing-valve, a tube threaded in the tubular stem of the throttle-valve, and a stem attached to the supply-nozzle valve and threaded in the tube.

13. A vaporizer having a casing with inlet and outlet orifices respectively for the air and mixture, said casing having a seat between said orifices and walls forming an air-chamber above the seat, a liquid-supply nozzle leading to the casing intermediate the inlet and outlet orifices, an automatic mixing-valve comprising a throat adjacent to the supply-nozzle, a valve proper at the upper end of the throat, the valve proper coacting with the end of the seat of the casing, a wall extending upward from the valve proper and lying opposite said air-chamber of the casing, the wall having a perforation therein communicating with the air-chamber, and means for yieldingly seating the automatic mixing-valve.

14. A vaporizer, comprising a casing having inlet and outlet orifices respectively for the air and mixture, a liquid-fuel supply entering the casing intermediate said inlet and outlet; the casing having a valve-seat between the fuel supply and mixture outlet, an air-chamber between the valve-seat and mixture-outlet, and a yieldingly-seated mixing-valve adapted to be opened by the fluid current through the casing, said valve acting with said seat and having an orificed wall extending over the air-chamber.

15. A vaporizer, comprising a casing having inlet and outlet orifices respectively for the air and mixture, a liquid-fuel supply entering the casing intermediate said inlet and outlet, the casing having a valve-seat between the fuel supply and mixture outlet, an annular air-chamber between the valve-seat and mixture-outlet, and a yieldingly-seated mixing-valve adapted to be opened by the fluid current through the casing, said valve acting with said seat and having an orificed wall extending over the air-chamber.

16. A vaporizer, comprising a casing having inlet and outlet orifices respectively for the air and mixture, a liquid-fuel supply entering the casing intermediate said inlet and outlet, the casing having a valve-seat between the fuel supply and mixture outlet, an air-chamber between the valve-seat and mixture-outlet, a yieldingly-seated mixing-valve adapted to be opened by the fluid current through the casing, said valve acting with said seat and having an orificed wall extending over the air-chamber, and an inwardly-extending baffle carried by the wall between the orifice thereof and the mixture-outlet.

In testimony whereof I have signed my name to this specification in the presence of the subscribing witnesses.

JAMES McINTOSH.

Witnesses:
 GEO. L. HAWN,
 GEORGE R. HECK,
 EDNA B. SPINDLER.